Patented July 10, 1934

1,966,407

UNITED STATES PATENT OFFICE 1,966,407

CORUNDUM PRODUCT AND PROCESS OF PRODUCING THE SAME

Earl Leeson Hauman, St. Catharines, Ontario, Canada, assignor to The Exolon Company, Blasdell, N. Y., a corporation of Massachusetts No Drawing. Application March 17, 1932, Serial No. 599,599

11 Claims. (Cl. 75—22.5)

This invention relates to electric furnace products and particularly to an aluminous oxide product resulting from the fusion and cooling of an alumina silica mix which should give mullite in preponderance to corundum but which when modified by the addition of a counterbalancing or absorption preventing agent which counterbalances the cooling characteristic of the furnace, thus extending the period of corundum crystal growth and shortening or eliminating entirely the later period of mullite development, forms a product of entirely new characteristics. Such product consists of a glassy matrix containing alpha corundum crystals of such relatively large and freely developed type as to constitute an entirely new variety of alpha corundum and for which I have coined the name "euhedral" corundum. These crystals constitute a preponderance of the mass and were developed in a glassy matrix of sufficient amount to have caused their free growth with little or no mullite formation.

My present invention is a continuation in part of my prior application Serial No. 311,262, filed October 8, 1928, to which reference is made as containing a general disclosure of my novel product and the method of producing the same.

The presence of incidental corundum in a normally mullite yielding alumina silica mix has been observed by workers in the art, but such incidental corundum existed in relatively insignificant amount and solely as an impurity in the mullite or sillimanite. These incidental corundum crystals were microscopic in size and of no commercial value. As shown in Fig. 8 of the article by Sims, Fisher & Wilson at p. 521 of their article in vol. XLVI of the Transactions of the American Electro Chemical Society for 1924.

In obtaining these incidental corundum crystals an excess of alumina was used in the melt than was necessary to develop mullite so that on solidification not all of the alumina was combined with the silica, forming a satisfied silicate (mullite) but instead a residue of alumina remained which crystallized out as corundum.

Sims, Wilson and Fisher at p. 525 of said article explained this phenomenon by stating that "Starting with molten material with a composition slightly greater in silica than the 3:2 ratio and allowing it to cool we find that at 1900° C. corundum starts to crystallize out, and continues until 1810° C. is reached. At this point sillimanite (mullite) $(3Al_2O_3 2S:O_2)$ needles start to form and the small corundum crystals are reabsorbed by the liquid. The sillimanite crystals continue to grow uninterrupted in a liquid medium through the comparatively long range of 265° C., or until the sillimanite-silica eutectic at 1545° C. is reached.

My discovery however was that starting with a molten mix of alumina and silica which normally would form mullite with little or no corundum, as shown by said Sims, Wilson & Fisher article, I can prevent the reabsorption of the corundum crystals by the liquid as the melt cools, thus giving me a preponderance of corundum in freely developed form with little or no mullite, the corundum although crystallizing out at 1900° C. and continuing through a temperature range of about 435° C., is not reabsorbed by the liquid at 1810° C. Such mullite as may be formed in my novel product is entirely incidental and exists solely as an impurity in the mass.

I prevent such mullite formation while at the same time permitting the free growth of the corundum crystals by the use of a counterbalancing or absorption-preventing agent which I add to the normal mullite yielding alumina-silica mix before or during the fusion of the mix. Such agent may be any of the alkaline earth oxides, as the oxides of beryllium, magnesium, calcium, barium, and strontium, or it may be any of the oxides of the alkali metals such as potassium, sodium, lithium, rubidium, and cesium, or any combination of these two oxide groups.

The selection of the balancing agent depends upon the characteristics wanted in the ultimate glass. If a glass of high melting point is wanted, one or more members of the alkaline earth group will be used. If a glass of low melting point is wanted, one or more members of the alkali group will be used. If a glass having a melting point between these high and low melting points is wanted, one or more members of the alkaline earth oxide group may be combined with one or more members of the alkali group.

In any event, it is of the utmost importance that the counterbalancing agent used shall prevent the absorption of the alumina, forming the aluminum silicate, and that the residual glassy matrix shall exist in sufficient amount to have provided for the free growth of the corundum crystals to the practical exclusion of the mullite. In other words, the balancing agent so modifies the solidifying action of the matrix-forming constituents of the melt, chiefly the silica, as to prevent or forestall any material absorption of the corundum crystals by the silica into the undesired mullite crystals as the melt cools. This counterbalancing agent is employed under such controlled conditions of power input, rate of cooling and adjustment of the quantity of the counterbalancing agent to the size of the melt as is necessary to prevent reabsorption of the corundum and undesired mullite growth.

In thus providing a balancing or reactive influence against the cooling effects existing in the process of solidifying such a normally mullite yielding alumina silica melt in the electric furnace, I necessarily have to adjust the quantity of the balancing agent to the several varying factors which may be present for any particular run. These factors may include the size or capacity of the furnace, the radiation from the top of the furnace and the transference of heat through the insulation and side walls, and also through the furnace bottom. Inasmuch as solidification takes places from the walls inward, the greater the mass the greater the time for crystal growth and solidification of the mass, the effect being the same as additional insulation with a smaller mass.

In any event, the resultant fusion product is a mass consisting of a glassy matrix and alpha corundum crystals of relatively large freely developed type, the alpha corundum crystals constituting a preponderance of the mass and the glassy matrix being present in sufficient amount to have caused the free growth of such corundum crystals, with little or no mullite formation. Such mass is capable of crushing to granular form to provide on the one hand a separation product which is high in glassy matrix and low in alumina crystals, containing in fact a higher glass content than the original mass, and on the other hand a crushed separation product which is high in alumina crystals and low in glassy matrix, such product containing in fact a higher crystalline alumina content than the original mass. As a still further separation product, I may have a product containing approximately equal parts of crystalline alumina and glass. As explained in my said prior application Ser. No. 311,262, such separation may be effected electrostatically or by any other well known means of classifying.

Petrographic analysis shows that the mass is a ground mass in which are embedded well developed transparent crystals showing no definite orientation. These crystals are optically identified with the irregular corundum grain familiar in the art, the striking difference being that they are well crystallized, or euhedral in form. These crystals are platy or tabular in habit, being elongated parallel to the basal direction, and frequently show hexagonal outlines. These platy crystals are truncated with rhombohedral faces, and in thin section may show a trapezoidal cross section. They present optical properties checking exactly with those of alpha corundum, namely, they give a uni-axial interference figure, the optical character is negative, and the index of refraction is above 1.74. The surface of these crystals is uncorroded, showing no evidence of attack by the glass while in the molten state.

The ground mass, or interstitial material in which the crystals occur, consists of a smooth dull black substance resembling flint or chert in appearance. It consists of an unstable glass, filled with microscopic inclusions. It is identified optically as a glass because it is isotropic, that is although transmitting ordinary light, between crossed nicols it is absolutely opaque, which shows that its optical properties are the same in all directions.

The greater part of the inclusions in this unstable glass consist of microscopic needle-like crystals, identified as mullite.

The glass, together with the inclusions, has a composition high in alumina and silica, and is in striking contrast to the slags or clear siliceous glassy matrices familiar in the art of preparing crystalline corundum of the ordinary type, or in producing artificial mullite with its accompanying siliceous glass and incidental corundum, Mullite crystals of a prismatic type are occasionally embedded between the plates of the corundum crystals in a thin layer of glass, but constitute an insignificant part of the whole. Such glass is an unstable glass consisting of the residual alumina, silica, and alkali or alkaline earth oxide used as the balancing agent, together with such metallic oxide impurities as may have been present in the original mix.

In a typical mix, such glass contains approximately 30% alumina, 50% silica, and 10% counterbalancing agent, the remainder being impurities.

When fired at ordinary bonding temperatures this unstable glass becomes stable and a profusion of larger needle-like mullite crystals are developed around the original mullite inclusions as nuclei. These mullite crystals give to the glass a remarkable mechanical and refractory strength. The glass thus becomes an excellent bond under kiln conditions common in the ceramic industry which bond as well as the crystal itself has the property of burning to a snow white color under oxidizing conditions so that when a mass of the crystals and matrix is ground to fine sizes a material is obtained which has the valuable property of being self-bonding in action. This gives a structure embodying both the abrasive and wear resisting properties of the fused aluminum oxide crystal in a ground mass of its original matrix and such a structure is exceptionally well adapted in the field of abrasive or wear resisting articles due to the simplicity of formation, the self-bonding action, the abrasive and wear resisting properties of the crystal and the presentation of any impurities in an easily oxidizable form, producing a substantially snow white article which is therefore subject to a wide variety of color applications well known in the ceramic field. The platy euhedral form of the crystal, moreover, is advantageous in that it enhances the structural strength of the article into which it is fabricated as well as possessing that important and recognized essential property in an abrasive article of constantly presenting new cutting edges by minute fracture in the process of wear or use.

My process can be so worked as to give at one side an euhedral crystal dispersion in a glassy matrix well adapted for refractory purposes, and special abrasive uses, or on the other side extended and accumulated growths of such crystals separable from the matrix material and of high abrasive and refractory values.

As illustrative of the principles involved I will describe the practice of my invention in two characteristic cases of product, each novel in itself, but resultant from the underlying principles involved in my invention.

In the practice of my invention I proceed as follows: A mixture of raw materials is prepared consisting of aluminous ore, such as Bauxite or diaspore, silica sand, and a counterbalancing or absorption preventing agent, such as magnesia, so proportioned as to give the following ratio of important ingredients:

$Al_2O_3$ -------------------------------------- 70
$SiO_2$ -------------------------------------- 25
$MgO$ -------------------------------------- 5

This mixture may be fused in an electric furnace of the steel shell arc type commonly used in the artificial abrasive industry. The ratio of power input to application of the mix is observed closely as a means of governing the temperature of the melt. Thus, under any given rate of power input, a fast feed produces a relatively cool melt, whereas a retarded feed tends to produce a relatively hot bath. The temperature of the melt at the time of withdrawal of the power, is a factor in determining the size and distribution of the corundum crystals. The cool melt produces small crystals uniformly spread through the matrix whereas the hot melt gives rise to the development of large crystals, in pocket formation in the mass.

After the shell has been charged to its capacity and the fusion is completed the electrodes are withdrawn and the cooling process allowed to proceed normally.

I have found that the addition of the alkali and/or alkaline earth oxide to the melt might be lowered with similar results in a furnace of small dimensions. For instance 2½% counterbalancing agent in a mass of 1000 pounds is sufficient, whereas a melt approaching 8000 pounds needs 5% counterbalancing agent for similar results, as to crystallization of the corundum.

Although proportions may vary largely according to the particular characteristics wanted in the ultimate product the following analyses are typical of the products obtained by my methods:

|  | A | B | C |
| --- | --- | --- | --- |
| Glassy matrix | 25 | 26.5 | 28 |
| Euhedral corundum | 75 | 68.5 | 62 |
| Mullite | 00 | 5 | 10 |

Any of the foregoing products may be obtained from the same mix by varying the furnace size, or assuming that they are all to be fused in the same furnace, the several products could be obtained by varying either the alumina-silica ratio or the percentage of magnesia addition. By adjusting the factors mentioned I have been able to form the euhedral corundum of varying mixes as low in alumina to silica ratio as 60 to 40 and as high as 86 to 14.

As a matter of fact, the mullite might be present in even greater amount, say up to 15%, than the amount indicated in Table C and still give a product which is commercially useful. Similarly, the ratio of glassy matrix to alpha corundum might be varied beyond the limits given in the foregoing tables. I have obtained commercially useful products in which the corundum limits were between 60% and 75% and the glassy matrix between 20% and 30%, the only requirement being that there shall be enough glassy matrix to promote the free growth of the corundum crystals to the substantial exclusion of the mullite, meaning thereby that the later period of mullite formation shall be either so shortened that the mullite will be present in relatively inconsiderable quantity, or entirely eliminated. Experience would indicate that anything under 20% of glassy matrix is an insufficient amount of glassy matrix to permit the free growth of the corundum crystal and I therefore set 20% as my lower limit for the glassy matrix.

As to the preponderance of corundum over mullite, this depends upon the particular use to which the final product is to be put and in any event means a product in which the corundum crystals constitute more than half of the mass of corundum crystals, mullite and glassy matrix.

Similarly, the ratio of alumina and silica is only approximate, the precise alumina silica ratio being really determined by the size of the furnace and the amount of magnesia or other counterbalancing agent added to the mix to counterbalance the cooling characteristics of the peculiar size of furnace employed, it being sufficient only that such ratio be a ratio which will produce corundum. Expressed differently, the alumina silica ratio is a ratio which, but for the addition of the furnace balancing agent of magnesia or the like, would produce mullite and corundum with a preponderance of mullite, but which because of the addition of such furnace balancing agent in an amount sufficient to produce a glassy matrix of sufficient size to extend the period of corundum crystal growth during cooling of the mullite and to shorten or eliminate the later period of mullite development produces alpha euhedral corundum to the practical exclusion of mullite. Cross reference is made to my concurrently filed application, Ser. No. 599,600.

What I therefore claim and desire to secure by Letters Patent is:—

1. As a new composition of matter, a mass consisting of a glassy matrix containing a preponderance of alpha corundum crystals without mullite in appreciable quantity, said mass resulting from the fusion and cooling of a mix consisting of from 60 to 86 parts of alumina to from 40 to 14 parts of silica together with an oxide of the group composed of alkaline earth and alkali metal oxides in sufficient amount to extend the period of corundum crystallization during cooling of the melt and to shorten or eliminate the later period of mullite development, the corundum crystals being relatively large as to size, platy as to form, and being well defined and freely developed as to structure, and the glassy matrix being present in sufficient amount to have provided for such free growth of the crystals and being an unstable glass rich in alumina and having the property of forming mullite and a stable clear glass on heating to ordinary bonding temperatures.

2. A new composition of matter as claimed in claim 1, wherein the mass contains approximately from 60 to 75% of the alpha corundum crystals.

3. A new composition of matter as claimed in claim 1, wherein the glassy matrix constitutes at least 20% of the mass.

4. A new composition of matter as claimed in claim 1, wherein the mass contains approximately from 60 to 75% of the alpha corundum crystals and said glassy matrix constitutes at least 20% of the mass.

5. A new composition of matter as claimed in claim 1, wherein the balancing agent is an oxide of an alkali metal.

6. As a new composition of matter, a mass consisting of a glassy matrix containing a preponderance of alpha corundum crystals without mullite in appreciable quantity, said mass resulting from the fusion and cooling of a mix consisting of from 60 to 86 parts of alumina to from 40 to 14 parts of silica together with an oxide of the group composed of alkaline earth and alkali metal oxides in sufficient amount to extend the period of corundum crystallization during cooling of the melt and to shorten or eliminate the later period of mullite development, the corundum crystals being relatively large as to size, platy as to form, a 1 being well defined and freely developed as to structure, the glassy matrix being present in sufficient amount to have provided for such free growth of the crystals, and said glassy matrix resembling flint or chert in appearance and being optically identified as an unstable glass and containing extremely small needle-like crystals of mullite, said glass and mullite inclusions being high in alumina and having the property of forming a stable clear glass on heating to ordinary bonding temperatures.

7. As a new composition of matter, a mass consisting of a glassy matrix containing a preponderance of relatively large, well defined and freely developed alpha corundum crystals without mullite in appreciable quantity, said mass resulting from the fusion and cooling of a mix consisting of from 60 to 86 parts of alumina to from 40 to 14 parts of silica together with an oxide of the group composed of alkaline earth and alkali metal oxides in sufficient amount to extend the period of corundum crystallization during cooling of the melt and to shorten or eliminate the later period of mullite development, the corundum crystals constituting from 60% to 75% of the mass and the glassy matrix constituting approximately 20% of the mass and being an unstable glass rich in alumina and having the property of forming mullite and a stable clear glass on heating to ordinary bonding temperatures.

8. As a new separation product resulting from crushing and separating the composition of matter claimed in claim 7, a ground mass of crystals and glass having a higher crystalline alumina content than the original composition of matter.

9. As a new separation product resulting from crushing and separating the composition of matter claimed in claim 7, a ground mass of crystals and glass having a higher glass content than the original composition of matter.

10. The furnace method of promoting free crystallization of alpha corundum in a glassy matrix, which consists in fusing an alumina silica mixture consisting of from 60 to 86 parts of alumina to from 40 to 14 parts of silica together with an absorption prevention oxide of the group composed of alkaline earth and alkali metal oxides, in sufficient amount to extend the period of corundum crystallization during cooling of the melt and to shorten or eliminate the later period of mullite development whereby to produce a mass consisting of a preponderance of relatively large, well defined and freely developed alpha corundum crystals and a minor dispersion of mullite in a glassy matrix of sufficient amount to have provided for such corundum development, said glassy matrix consisting of the residual alumina, silica and balancing oxide and having the property of forming mullite and a stable clear glass on heating to ordinary bonding temperatures.

11. The furnace method as claimed in claim 10, wherein the absorption prevention agent is an oxide of an alkali metal.

EARL LEESON HAUMAN.